Feb. 17, 1948. B. GLATSTEIN 2,436,294
INFANT'S CONVERTIBLE BED AND SEAT
Filed Feb. 16, 1945 2 Sheets-Sheet 1

INVENTOR.
BYRDIE GLATSTEIN
BY
Merrill M. Blackburn
ATTORNEY.

Feb. 17, 1948.                B. GLATSTEIN                2,436,294
                    INFANT'S CONVERTIBLE BED AND SEAT
                    Filed Feb. 16, 1945          2 Sheets-Sheet 2
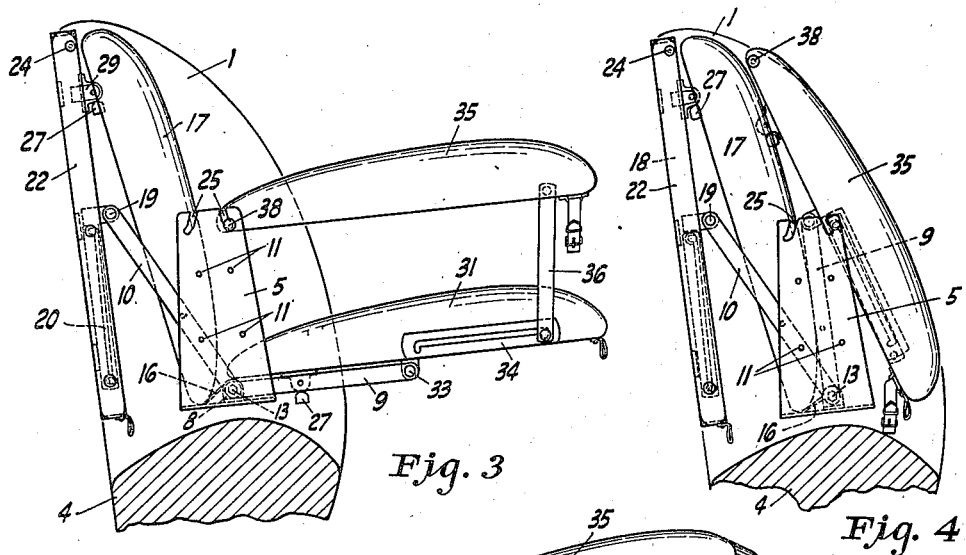
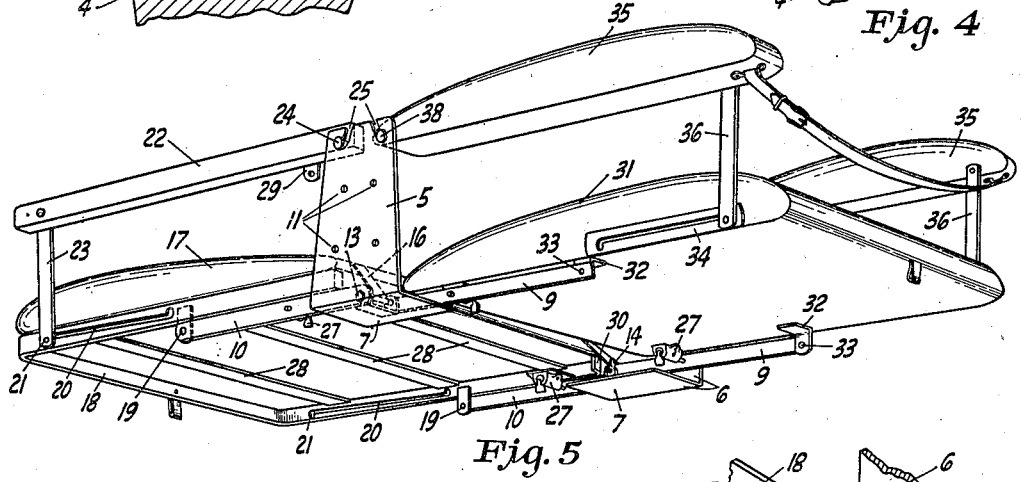
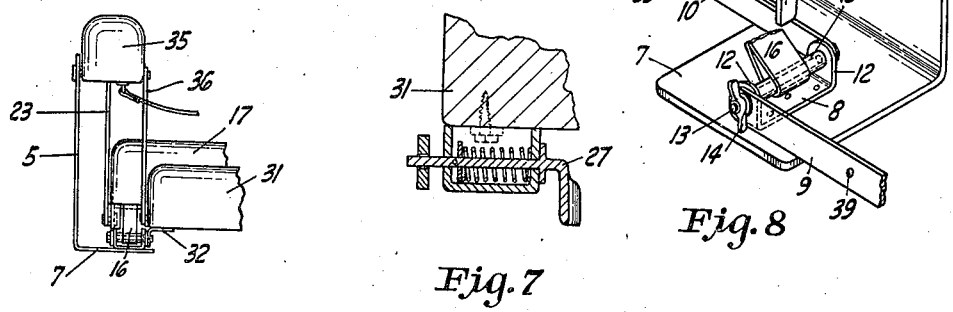
INVENTOR.
BYRDIE GLATSTEIN
BY Merrill M. Blackburn.
ATTORNEY.

Patented Feb. 17, 1948

2,436,294

UNITED STATES PATENT OFFICE 2,436,294

INFANT'S CONVERTIBLE BED AND SEAT

Byrdie Glatstein, Muscatine, Iowa

Application February 16, 1945, Serial No. 578,238

11 Claims. (Cl. 155—132)

The present invention relates to a structure in the nature of an auxiliary seat to be mounted between the two sections of a divided adult seat, the same being capable of adjustment for use as an infant's bed, an infant's seat, or as a back for the space between the two sections of the divided adult seat. While this structure may be used for other purposes, its primary intended function is use in connection with the front seat of an automobile to furnish a conveniently arranged seat or bed for an infant.

Among the objects of this invention are the provision of a readily foldable unit adapted to be inserted between and secured to the two sections of a divided adult seat, the same being adapted to be converted from a bed to a seat and vice versa; the provision of a unit of the type indicated which, when completely folded, is out of the way of adults and completes the back rest of the adult seat; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 3 represents a view similar to Fig. 2 but with a part of the infant's unit folded up, whereby to form an infant's seat;

Fig. 4 represents a view similar to Fig. 3 but with the unit folded up completely so as to be entirely out of the way of adults using the adult vehicle seat;

Fig. 5 represents a perspective view of the convertible unit constituting the subject matter of this invention, detached from the vehicle seat and in entirely unfolded arrangement;

Fig. 6 represents a fragmentary front elevational view of one side of this unit, looking in the direction of the arrows 6—6, Fig. 2;

Fig. 7 represents a transverse section substantially along the plane indicated by the line 7—7, Fig. 1; and Fig. 8 represents a perspective view of a part of this structure, as shown in Fig. 5, enlarged to show more clearly the relationship of the parts.

Figure 1:
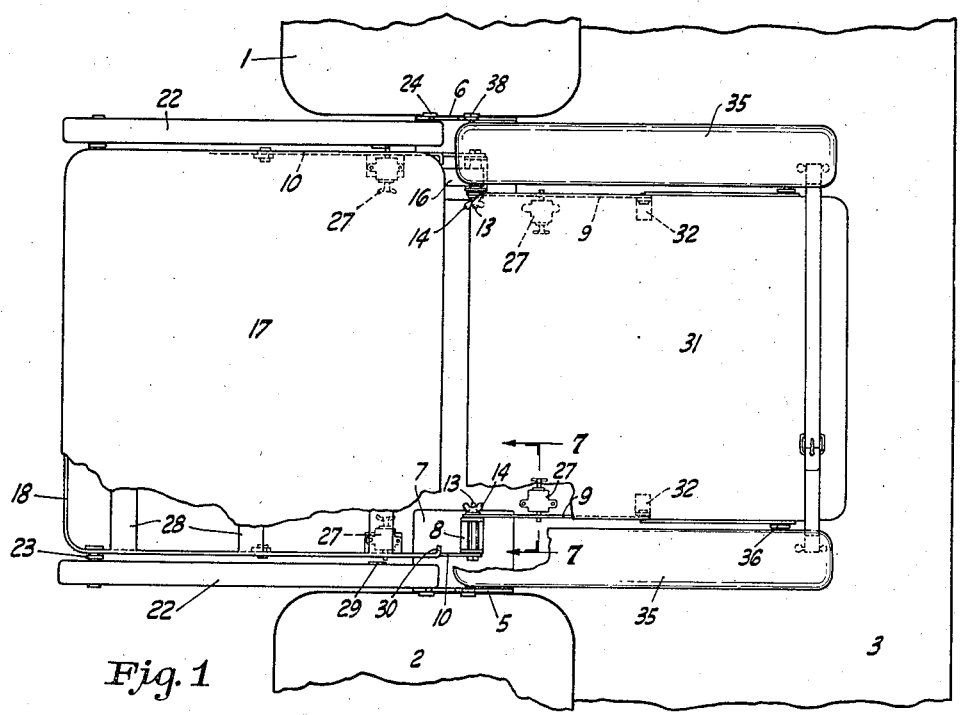
Fig. 1 shows a plan view of the unit constituting the subject matter of this invention, the sections of the adult seat, as well as of this unit, being partly broken away.

Reference will now be made in greater detail to the annexed drawings for a more complete description of this invention. The utilization of this unit requires special construction of the adult seat, the back of which must be wholly or partly divided to permit the installation of this unit between the two sections 1 and 2 of the adult seat. The seat part 3 of the adult seat would not need to be changed in any way in order to accommodate the foldable unit constituting the subject matter of the present invention. While the back of the adult seat may be completely divided, if for any reason this should be desired, I prefer to have only the upper part thereof modified for the reception of this unit, the lower portion of the back coming up almost to the supporting brackets constituting a part of this unit, as shown at 4. No attempt has been made to show the internal structure of the seat back as this will be made in accordance with the wishes of the manufacturer.

A pair of brackets 5 and 6 have their lower ends turned inwardly, as indicated at 7, to form supporting feet for pivot members 8 and motion-limiting means for the arms 9 and 10. As is evident from the drawing, the brackets 5 and 6 are secured to the lateral edges of the separate parts of the adult seat by means of screws or bolts passed through the openings 11 and into corresponding openings in the supporting structure of the sections of the adult seat. As is clear from Fig. 8, the horizontal supporting feet 7 of the brackets 5 and 6 have pivot members 8 rigidly secured thereto. These pivot members have upstanding arms 12 through which is passed a bolt 13 provided with a wing-nut 14 which may be tightened up to hold the arms 9 and 10 in folded position when the unit is partly or entirely folded up. A sleeve 15 is slipped over the bolt 13 and is just long enough to fill the space between the arms 12, thus making it possible rigidly to clamp the arms 9 and 10. Loops 16 surround the sleeves 15 and extend backwardly to the forward edge of the seat 17 whereby to hold this against sliding off from its supporting framework.

Figure 2:
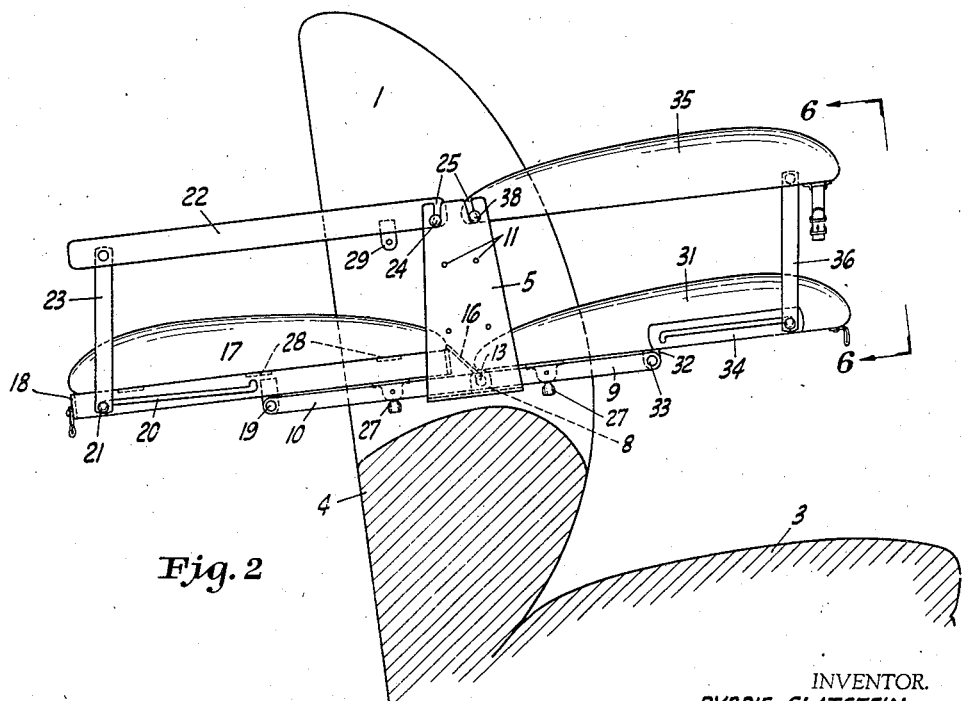
Fig. 2 represents a side view of the structure shown in Fig. 1 with the nearer section of the adult seat removed to show more clearly the details of construction of this unit.

A U-shaped frame 18 is pivotally connected at 19 to the rear ends of the arms 9 so that this frame may be folded from the position shown in Fig. 5 to that shown in Fig. 3. The legs of this frame 18 are provided with longitudinal slots 20 for reception of pins 21 having heads at their inner ends to prevent accidental removal of the pins from the slots. These slots are provided at their ends with angularly arranged extensions, as shown most clearly in Figs. 2 and 5, these extensions being intended to prevent relative longitudinal motion between the legs of the frame 18 and the arm rests 22. The pivot pins 21 are mounted in the lower ends of the arm-rest supports 23, and the upper ends of these supports are pivotally connected to the arm rests 22.

At their forward ends, the arm rests 22 are provided with pins 24 which are insertable into and removable from the slots 25 formed in the upper ends of the brackets 5 and 6. When it is desired to fold the rear part of this structure into the position shown in Fig. 3, the arm rests 22 are raised to take the pins 21 out of the ends of the slots 20, and then these pins are moved along the slots as the arm rests 22 are lowered. In order to lower the forward ends of the arm rests 22, it is necessary to remove the pins 24 from the slots 25, and then the arm rests can be lowered to occupy positions along side of the legs of the frame 18. When the parts are in this position and the wing-nuts 14 are loosened, the arms 10 can be swung upwardly and the frame 18 turned in the opposite direction. A spring fastener 27, of any suitable type, such, for example, as that shown in Fig. 7, may be mounted on one of the cross-bars 28 of the frame 18. As a matter of fact, I have shown, in Fig. 5, two of these latches 27 connecting the frame 18 and the arms 10. Ears 29 are carried by the arm rests 22, and the latches 27 engage in the openings of these ears 29 to hold the arm rests 22 in alignment with the legs of the frame 18. This is clear from Figs. 3 and 5. The bent ends 30 of the legs of the frame 18 engage the upper edges of the arms 10 and prevent pivotal motion in the wrong direction about the pivots 19.

As previously indicated, the arms 9 are pivoted about the bolts 13 and are prevented by contact with the feet 7 from dropping below a horizontal position. This will be obvious from Fig. 8. The infant's seat 31 has brackets 32 secured to the under side thereof, and these brackets are pivotally connected at 33 to the forward ends of the arms 9 whereby to permit the seat 31 to turn forwardly about the pivots 33. When the wing-nuts 14 are loosened, the arms 9 may be turned upwardly to lift the seat 31. Then, by disconnecting the latches 27 from the arms 9, it will be possible to turn the seat about the pivots 33 into the position shown in Fig. 4.

Longitudinally slotted plates 34 are attached to the lateral edges of the seat 31 and furnish a means for attachment of the arm rests 35 to the seat 31. This is accomplished by means of the props 36, provided at their lower ends with pins which project through the longitudinal slots in the plates 34, as is clear from Figs. 3 and 5.

The arm rests 35 are provided with laterally projecting pins 38, which may be received in slots 25 similar to those described above. This connection serves to support the rear ends of the arm rests 35 while the front ends are supported by the props 36. The operation of this part of the structure is comparable to that heretofore described in that the pins 38 are lifted out of the slots 25, the props 36 are raised and swung backwardly, and then the arm rests are lowered into positions laterally adjacent the seat 31. The seat and arm rests can then be raised together into the position shown in Fig. 4. The arms 9 and 10 are provided with openings 39 for the reception of the ends of the pins of latches 27, as heretofore described.

It is of course understood that the specific description of structure set forth above may be departed from without departing from the spirit of this invention as set forth in this specification and the appended claims.

Having now described my invention, I claim:

1. A vehicle seat comprising a pair of spaced adult seat-back sections having lateral frame members, an infant's seat having lateral brackets attached to said lateral frame members, a framework for the infant's seat attached to said brackets for pivotal motion in a vertical direction, said framework comprising a forwardly extending unit and a rearwardly extending unit, each pivotally connected to said brackets and adapted to fold up into approximately vertical positions and to fold down into approximately horizontal positions, a seat member pivotally connected to the forward end portion of the forward one of said units so that its rear edge may be brought substantially into alignment with the tops of the adjacent adult seat-back sections, with its top face substantially in alignment with the forward faces of the adjacent adult seat-back sections, and its forward edge adjacent the lower ends of the lateral brackets, when folded, said rearwardly extending unit having a frame pivotally connected to its rear extremity, and a cushion supported by said frame.

2. In a vehicle, a seating arrangement comprising a seat having laterally spaced back sections, each having a supporting framework, brackets secured to said framework, facing each other, said brackets having their longitudinal dimensions extending vertically and the lower ends of the brackets being bent inwardly toward each other to occupy a substantially horizontal position, supporting frames pivotally mounted on said lower ends for swinging movement in a vertical direction, one of them extending forwardly and the other rearwardly from their pivotal connection to the brackets when in lowered position, parts of said lower ends serving as stop means to limit swinging movement of the frames in one direction, seat and bed cushions supported by said frames in a substantially horizontal position, said brackets being provided in their upper end portions with apertures for the reception of supporting pins, arm rests having laterally projecting supporting pins adjacent their normally rear ends, said pins being detachably received in said apertures, said arm rests being adapted to project forwardly from said supporting pins, and supporting means connecting the forward ends of the arm rests with the forward edge portion of the infant's seat, the forwardly extending seat frame, when folded upwardly, carrying the rear portion of the infant's seat upwardly to occupy a position between the edge portions of the laterally spaced back sections whereby to substantially fill out the forward face of the seat back.

3. In a vehicle, a seating arrangement comprising a seat having laterally spaced back sections, each having a supporting framework, brackets secured to said framework, facing each other, said brackets having their longitudinal dimensions extending vertically and the lower ends of the brackets being bent inwardly toward each other to occupy a substantially horizontal position, supporting frames pivotally mounted on said lower ends for swinging movement in a vertical direction, one of them extending forwardly and the other rearwardly from their pivotal connection to the brackets when in lowered position, parts of said lower ends serving as stop means to limit swinging movement of the frames in one direction, seat and bed cushions supported by said frames in a substantially horizontal position, said brackets being provided in their upper end portions with apertures for the reception of supporting pins, arm rests having laterally projecting supporting pins adjacent their normally rear ends, said pins being detachably received in said apertures, said arm rests being adapted to project forwardly from said supporting pins, and supporting means connecting the forward ends of the arm rests with the forward edge portion of the infant's seat, the forwardly extending seat frame, when folded upwardly, carrying the rear portion of the infant's seat upwardly to occupy a position between the edge portions of the laterally spaced back sections whereby to substantially fill out the forward face of the seat back, the infant's seat having longitudinally slotted guide plates mounted along its lateral edges, near the front ends thereof, and the forward end portions of the arm rests being connected to the guide plates by links, pivotally connected to the arm rests and provided with pins extending through the slots in the plates.

4. In a vehicle, a seat having laterally spaced back rest-sections, mounting brackets secured to the mutually facing edges of said rest-sections, said brackets having their longitudinal dimension extending approximately vertically and their lower ends bent laterally toward each other, pivot members supported on said laterally bent ends, frame members pivotally mounted on said pivot members, cushion members supported on said frame members to serve as an infant's bed, and guard means supported adjacent the lateral edges of said cushion members to keep an infant from inadvertently rolling off from the bed, the lateral edges of the front cushion member having longitudinally slotted plates secured thereto and the adjacent guard means having supports connecting them with the slots of said plates, said supports having pins projecting therefrom into the slots to assist in connecting the guard means to the plates.

5. A seating structure for a vehicle comprising a unit having seat and back elements, the upper portion of the back element having a notch of substantial dimensions formed therein and transversely therethrough, said notch having substantially parallel side walls, brackets formed from plates bent crosswise to form two arms arranged at substantially right angles to each other, each bracket having one of its arms secured to one of said side walls with the second arm extending laterally toward the opposite bracket, said second arms having pivot elements attached thereto in a position parallel to the second arms and perpendicular to the first mentioned arms, supports pivotally mounted on said pivots, two of them extending forwardly and two rearwardly from the brackets, said supports being adjustable about their pivots to be turned from a substantially horizontal to an approximately vertical position, and from vertical to horizontal position, the forwardly extending supports having a cushioned element pivotally connected thereto to occupy an approximately horizontal position when its supports are horizontal and, when its supports are approximately vertical, to occupy a position such that its supporting face is substantially in alignment with the forward faces of the sections of the back element, thus forming a substantially continuous back element, the rearwardly extending supports, in horizontal position, serving as supporting means for a cushion means adapted to form a part of an infant's bed.

6. A seating structure for a vehicle comprising a unit having seat and back elements, the upper portion of the back element having a notch of substantial dimensions formed therein and transversely therethrough, said notch having substantially parallel side walls, brackets formed from plates bent crosswise to form two arms arranged at substantially right angles to each other, each bracket having one of its arms secured to one of said side walls with the second arm extending laterally toward the opposite bracket, said second arms having pivot elements attached thereto in a position parallel to the second arms and perpendicular to the first mentioned arms, supports pivotally mounted on said pivots, two of them extending forwardly and two rearwardly from the brackets, said supports being adjustable about their pivots to be turned from a substantially horizontal to an approximately vertical position, and from vertical to horizontal position, the forwardly extending supports having a cushioned element pivotally connected thereto to occupy an approximately horizontal position when its supports are horizontal and, when its supports are approximately vertical, to occupy a position such that its supporting face is substantially in alignment with the forward faces of the sections of the back element, thus forming a substantially continuous back element, the rearwardly extending supports, in horizontal position, serving as supporting means for a cushion means adapted to form a part of an infant's bed, the rearwardly extending supports having a U-shaped frame pivotally connected to their rearward end portions, the ends of the arms of the U-shaped frame extending forwardly from their pivotal connection and engaging the rearwardly extending supports, a cushion member supported by the U-shaped frame, thus forming a substantially horizontal bed, and means connecting the rearward element with the bracket for preventing inadvertent rearward tipping of the rearwardly extending bed portion.

7. A seating structure for a vehicle having seat and back elements, the back element having a notch of substantial dimensions extending downwardly from the top edge thereof, the side walls of the notch being normally substantially vertical, supporting brackets attached to said side walls and each having a laterally extending projection adjacent its lower end, said laterally extending projections supporting pivot members, cushion-supporting arms connected at one end to said pivot members for turning movement thereabout in a substantially vertical direction, from a horizontal position to a vertical position and vice versa, said laterally extending projections serving as stops to limit turning movement of said arms in one direction, cushions supported by said supporting arms, and other arms substantially parallel to the first arms, connected at one end to said brackets and at their second ends indirectly to the cushions, said other arms serving as means for keeping a child lying on the cushions from rolling off therefrom.

8. In a vehicle, a seat having a back rest provided in its mid-portion with a notch of substantial dimensions having substantially vertical side walls, brackets secured to said side walls with their longitudinal dimension approximately vertical, said brackets having at their lower ends seat-supporting extensions directed horizontally toward each other, pivot members on said extensions substantially in alignment with each other, cushion-supporting arms pivotally connected to said pivot members and capable of swinging in a vertical direction from an approximately vertical position to an approximately horizontal position to rest on the bracket extensions and be stopped thereby, and cushions supported by said supporting arms and pivotally connected thereto, whereby said cushions are caused to extend forwardly and rearwardly with relation to the vehicle and its seats, the forward cushion being adapted, when in lowered position, to serve as an infant's seat and to be raised to serve as a bridge for the gap in the forward face of the back-rest of the vehicle seat.

9. An infant's convertible seat and bed comprising, in combination, a pair of mounting brackets having bodies and supporting extensions extending at substantially right angles to the planes of the bodies of the brackets, cushion elements, extended pivotal connecting means pivotally connecting said cushion elements to said extensions to swing in a direction substantially parallel to the planes of the bodies of the brackets, and arm rests spaced from one of said cushion elements, having one end connected to the part of the bracket bodies remote from the extensions and the other end indirectly connected to and supported by the part of the cushion element associated therewith which is remote from the brackets, said pivotal connecting means being adapted to occupy extended positions and folded positions, and when occupying extended positions to rest on said supporting extensions.

10. A structure for the purpose indicated, for use in a vehicle having seat-back sections, spaced laterally from each other, comprising mounting means for attachment to the adjacent edges of said seat-back sections, the seat-back sections having back cushions and supporting framework, the mounting means being mounted upon and secured to said framework, said structure having a framework pivotally attached to said mounting means, cushions carried by said pivotally attached framework and adapted to be positioned between the seat back sections when the pivoted framework is folded up, latching means for holding the cushion-carrying framework in folded or extended position, and foldable arm-rest members connected to the mounting means and indirectly to the cushions and adapted to be folded into approximate alignment with the cushions during folding of the framework.

11. A seating arrangement for a vehicle comprising, in combination, a pair of laterally spaced seat back sections having supporting frames, brackets provided with laterally projecting flanges adjacent their lower ends, said brackets being secured to the mutually facing edges of said back sections, said flanges having pivotal members mounted thereon, forwardly and rearwardly extending arms pivotally connected to said pivot members to be swung in a vertical direction thereon, the forwardly extending arms having a child's seat pivotally connected thereto, said child's seat being foldable forwardly about its pivot connection with said arms as the forwardly extending arms are raised, the rearwardly extending arms having a frame pivotally connected thereto and tiltable rearwardly about its pivotal connection to the rearwardly extending arms as they are raised, and a loose cushion adapted to rest on said frame when it occupies a substantially horizontal position, said loose cushion being adapted to occupy a position between the frame and the said seat when the structure is completely folded.

BYRDIE GLATSTEIN.

REFERENCES CITED

The following references are of record in the file of this patent:

UNITED STATES PATENTS

| Number | Name | Date |
| --- | --- | --- |
| 1,157,880 | Luse | Oct. 26, 1915 |
| 1,241,420 | Murray | Sept. 25, 1917 |
| 1,253,241 | Haussinger | Jan. 15, 1918 |
| 1,649,702 | Johnston | Nov. 15, 1927 |
| 1,807,262 | Wages | May 26, 1931 |
| 2,128,168 | Schulz | Aug. 23, 1938 |
| 2,337,480 | Logan | Dec. 21, 1943 |

FOREIGN PATENTS

| Number | Country | Date |
| --- | --- | --- |
| 450,425 | Great Britain | July 17, 1936 |